United States Patent

Travieso et al.

[11] Patent Number: 5,857,051
[45] Date of Patent: Jan. 5, 1999

[54] HIGH DENSITY RISER AND PLENUM BREAKOUT CABLES FOR INDOOR AND OUTDOOR CABLE APPLICATIONS

[75] Inventors: Ruben Travieso, Alpharetta; Montri Viriyayuthakorn, Norcross, both of Ga.

[73] Assignee: Lucent Technologies Inc., Murray Hill, N.J.

[21] Appl. No.: 844,745

[22] Filed: Apr. 21, 1997

[51] Int. Cl.$^6$ ..................................................... G02B 6/44
[52] U.S. Cl. ........................... 385/114; 385/103; 385/106; 385/113
[58] Field of Search ...................................... 385/100–114

[56] References Cited

U.S. PATENT DOCUMENTS 5,229,851  7/1993  Rahman ................................... 385/114
5,531,064  7/1996  Sawano et al. ...................... 385/114 X

*Primary Examiner*—Phan T. H. Palmer

[57] ABSTRACT

The breakout cable is made up of an arrangement of optical fiber ribbon structures. Arranged above and/or below the optical fibers in each of the ribbon structures are strength members which are preferably made of an aramid fiber, such as KEVLAR. The combined optical fibers and strength members are surrounded by a sheath, which is preferably made of a suitable plastic, such as a material selected from the group consisting of polyolefin, PVC, low smoke PVC, EVA, FEP, PVDF, and thermoplastic fluoropolymers, thereby forming the high strength, sheathed optical fiber ribbon structure arrangement. A plurality of these individually sheathed ribbon structures can be stacked to form higher density ribbon bundles, or subunits, which can be further surrounded by sheaths. Similarly, a large numbers of such high density ribbon bundle subunits can be combined within a protective sheath to form cables which can be pulled through risers and plenums in the construction of premises, such as apartment buildings or commercial buildings, or used in appropriate indoor/outdoor applications. Accordingly, even as subunits are broken out of the cables, and as ribbon structures are broken out of the subunits, the optical fibers will still be surrounded by high strength members which will help protect them from breakage.

14 Claims, 3 Drawing Sheets

HIGH DENSITY RISER AND PLENUM BREAKOUT CABLES FOR INDOOR AND OUTDOOR CABLE APPLICATIONS

BACKGROUND OF THE INVENTION

The present invention relates to cables used for indoor and/or outdoor applications. In particular, the present invention relates to a high density breakout cable used for the cabling or "wiring" of fiber optic cables through a premises or commercial building.

In the wiring of premises, such as apartment and commercial buildings, with optical fiber cables, it is common to use a cabling system in which many cables enter the premises and individual cables are broken out for use in individual premises within the building.

Heretofore, it has been known to use a high density breakout cable system as a means for wiring such premises. The fiber optic cables (called "breakout cables") which were used were typically available in spools which could be pulled through the building in a standard manner. Problems which existed with breakout cables are that they are subjected to a number of different stresses. These include the act of pulling the cables through the premises, e.g., through plenums and risers, which places stress upon the cable system and which can cause breakage or damage to the optical fibers within the cable system. Other stresses include environmental stresses, bending stresses, and others well known to those skilled in the art.

SUMMARY OF THE INVENTION

In order to avoid any unnecessary breakage or damage to the optical fibers which make up the cable system used for high density applications, such as apartments and commercial buildings, a new cabling system has been developed in which a cable jacket surrounds a plurality of cables. Each of the cables is made up of optical fiber ribbon bundles which include ribbon structures having optical fibers which are wrapped, together with individual strength members, within a protective sheath.

In accordance with the invention, an optical fiber ribbon bundle comprises a plurality of ribbon structures made of optical fibers. Each of the ribbon structures comprises a plurality of optical fibers. Each of the optical fibers is adjacent to another optical fiber, wherein each of the ribbon structures has a single layer of optical fibers, and each of the ribbon structures has a top side above the layer of optical fibers and a bottom side below the layer of optical fibers.

Each ribbon structure in the optical fiber ribbon bundle further comprises at least one strength member positioned along either the top side and/or the bottom side of the optical fibers. The strength member is made of a fiber material having a breaking strength which is substantially greater than that of the optical fibers. In addition, the ribbon structure comprises a protective sheath which surrounds the optical fibers and the strength member. Finally, there is a subunit sheath which surrounds all of the ribbon structures within the ribbon bundle.

In accordance with another embodiment of the invention, a high density fiber optic cable for premises wiring comprises a plurality of fiber optic ribbon bundles. Each ribbon bundle comprises a plurality of ribbon structures made of optical fibers. Each of the ribbons comprises a plurality of optical fibers. Each of the optical fibers is adjacent to another optical fiber, whereby the ribbon structure has a single layer of optical fibers and the ribbon structure has a top side above the layer and a bottom side below the layer.

There is at least one strength member which is arranged along the top side and/or the bottom side of the layer of optical fibers. The strength member is made of a fiber material having a breaking strength which is substantially greater than that of the optical fibers. A protective sheath surrounds the ribbon structure, and a subunit sheath surrounds all of the ribbon structures within each ribbon bundle. There is an outer sheath which surrounds a plurality of said ribbon bundles.

In order to use the cabling system of the present invention, the outer PVC jacket is stripped to expose the inner strength members which are then affixed to a connector where they are crimped and/or glued in the standard manner. As subunits and ribbon structures are broken out of the cable of the present invention, they are each protected by their associated strength members.

DETAILED DESCRIPTION OF AN EXEMPLARY EMBODIMENT

Figure 1:
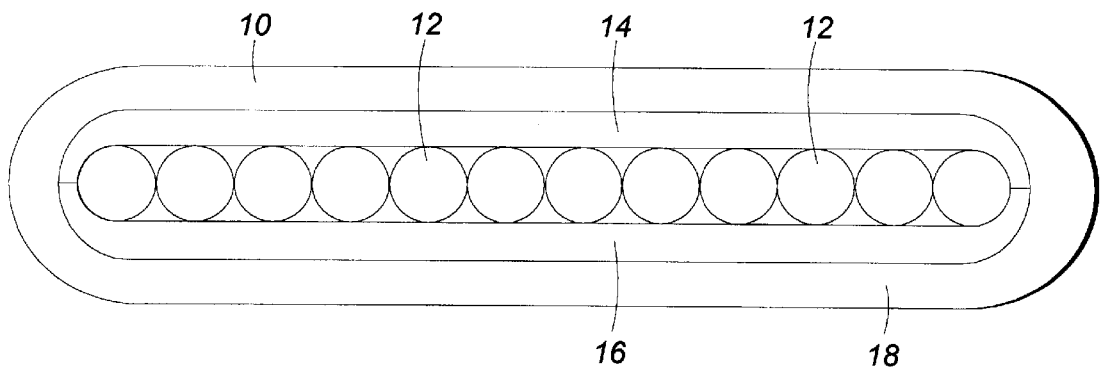
FIG. 1 is a cross section of a single ribbon structure manufactured in accordance with the prior art.

Referring to FIG. 1, a single ribbon structure 10, used in the present invention, is shown. As illustrated, the single ribbon structure 10 is comprised of a plurality of individual optical fibers 12. The optical fibers 12 are preferably aligned in a single layer of optical fibers which are adjacent to one another and which have individual strength members 14, 16 on their top and bottom sides. The single ribbon structure 10 containing the optical fibers 12 and the individual strength members 14, 16 is surrounded by a ribbon insulating, or ribbon protective sheath 18.

In accordance with the present invention, the strength members 14, 16 are comprised of a strength flexible material. One such material is sold by E. I. Du Pont de Nemours and Company of Wilmington, Del. under the trademark KEVLAR. The strength members 14, 16 may, for example, be aramid yarn which has been woven to form a tape. Alternatively, to save expense, the strength fiber material can be loosely bound within the single ribbon structure 10. The term "strength member", as used herein, is intended to include both loose and woven material. The purpose of the strength members 14, 16 is to insure that when the cable is pulled, the strength members 14, 16, rather than the optical fibers 12, act as a stress relief Accordingly, when the cable is unwound from a spool or pulled through a plenum, there is no damage to the optical fibers contained within a cable. Consequently, it is the intent of the present invention that the strength members 14, 16 can be mechanically coupled to a connector of the type used to make optical connections to the optical fibers 12. Accordingly, when cables using the present invention are unwound from a spool and they are pulled through a premises, with the strength members 14, 16 mechanically coupled to a connector, the strength members 14, 16, rather than the optical fibers 12, absorb the stress imposed upon the cable as it is pulled through the premises.

Figure 2:
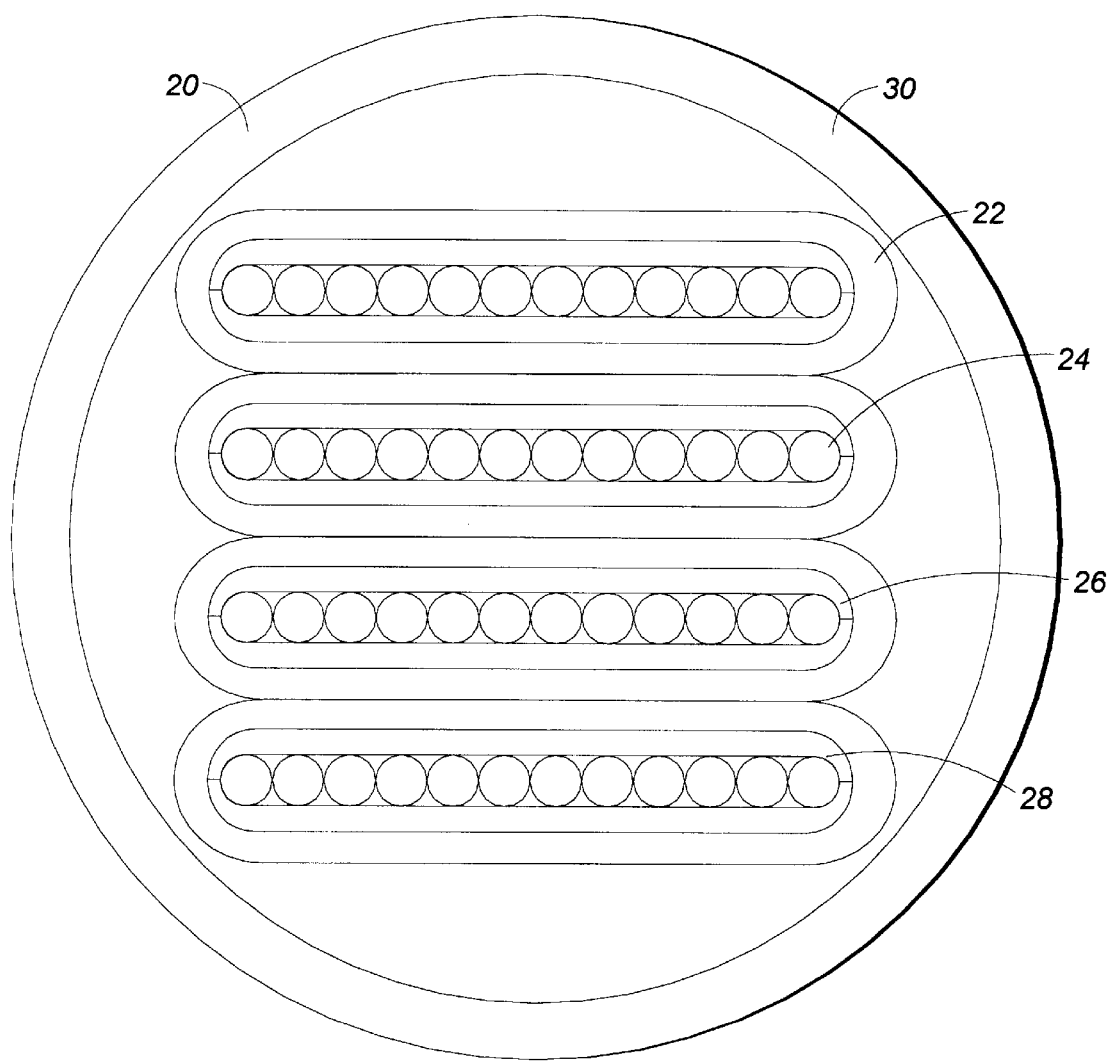
FIG. 2 is a cross sectional view of a plurality of the single ribbon structures of FIG. 1 bundled together into a ribbon bundle subunit in accordance with the present invention.

In accordance with the present invention, in order to increase the fiber count of cables, several of the single ribbon structures 10 of the type shown in FIG. 1 can be bundled together to form a structure, such as the ribbon bundle subunit 20 shown in FIG. 2. With reference to FIG. 2, a series of ribbon structures 22, 24, 26, 28, each of which is of the type illustrated in FIG. 1, are helically wound or assembled in a reverse oscillating lay and bundled together, and they are surrounded by a subunit sheath 30 to form the ribbon bundle subunit 20.

Figure 3:
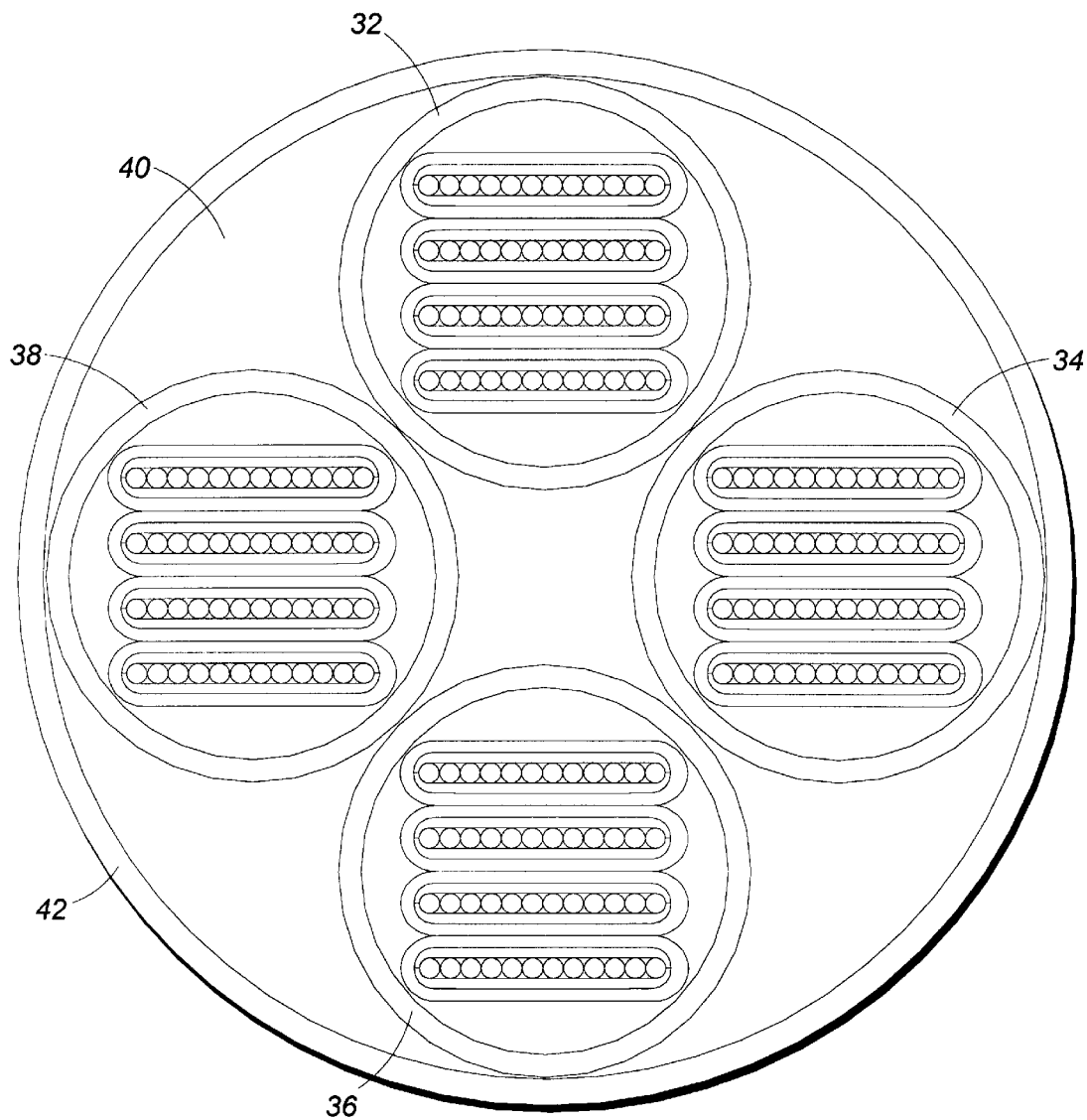
FIG. 3 is a cross sectional view of a plurality of the ribbon bundle subunits of FIG. 2 which have been bundled together into a cable.

To further increase the fiber count, the present invention contemplates that a plurality of the ribbon bundle subunits 20, of the type shown in FIG. 2, can themselves be bundled together within a density breakout cable structure 40 as illustrated in FIG. 3. With reference to FIG. 3, four ribbon bundle subunits 32, 34, 36, 38 are assembled together and they are, in turn, bound together by an outer sheath 42 to form the cable structure 40.

As will be understood by those skilled in the art, the ribbon protective sheath 18, the subunit sheath 30, and the outer sheath 42 which are used on the single ribbon structure 10, the ribbon bundle subunit 20, and the cable structure 40, respectively, can be made out of a flame retardant material, such as polyvinylchloride ("PVC") for premises uses, or a non-halogen material, such as a polyolefin, for outdoor applications. Other materials which may be used for particular applications include so-called "low smoke" PVC, polyvinylidene fluoride ("PVDF") copolymers, ethylene vinyl acetate ("EVA"), fluorinated ethylene prolpylene ("FEP") containing polymers such as polytetrafluoroethylene ("PTFE"), such as TEFLON (a trademark of E. I. Du Pont de Nemours and Company), thermoplastic polymers, such as HALAR (a trademark of Allied Chemical Corporation). As will be obvious to those skilled in the art, the particular selection of materials for use as the sheath can be varied to include other materials, as may be dictated by environmental or other considerations. Herein, the discussion will be limited to PVC and polyolefin, although those skilled in the art will recognize that any other suitable material can be suitably substituted without departing from the spirit or scope of the invention.

In order to allow the ribbon bundle subunits 32, 34, 36, 38 to slide relative to one another within the outer sheath 42, so as to facilitate bending the cable structure 40, the ribbon bundle subunits 32, 34, 36, 38 are preferably covered by a powder, such as talc.

Cables, such as the cable structure 40 illustrated in FIG. 3 which employ the present invention, can readily be pulled through risers and plenums in the standard manner. However, unlike the cables of the prior art, the cables using the present invention will still have strength members within them even after the ribbon bundles have been broken out of the main cable structure 40. Similarly, as individual optical fiber ribbons 10 are broken out of the ribbon bundle subunits, they will also continue to have strength members around them, as illustrated in FIG. 1.

Figure 4:
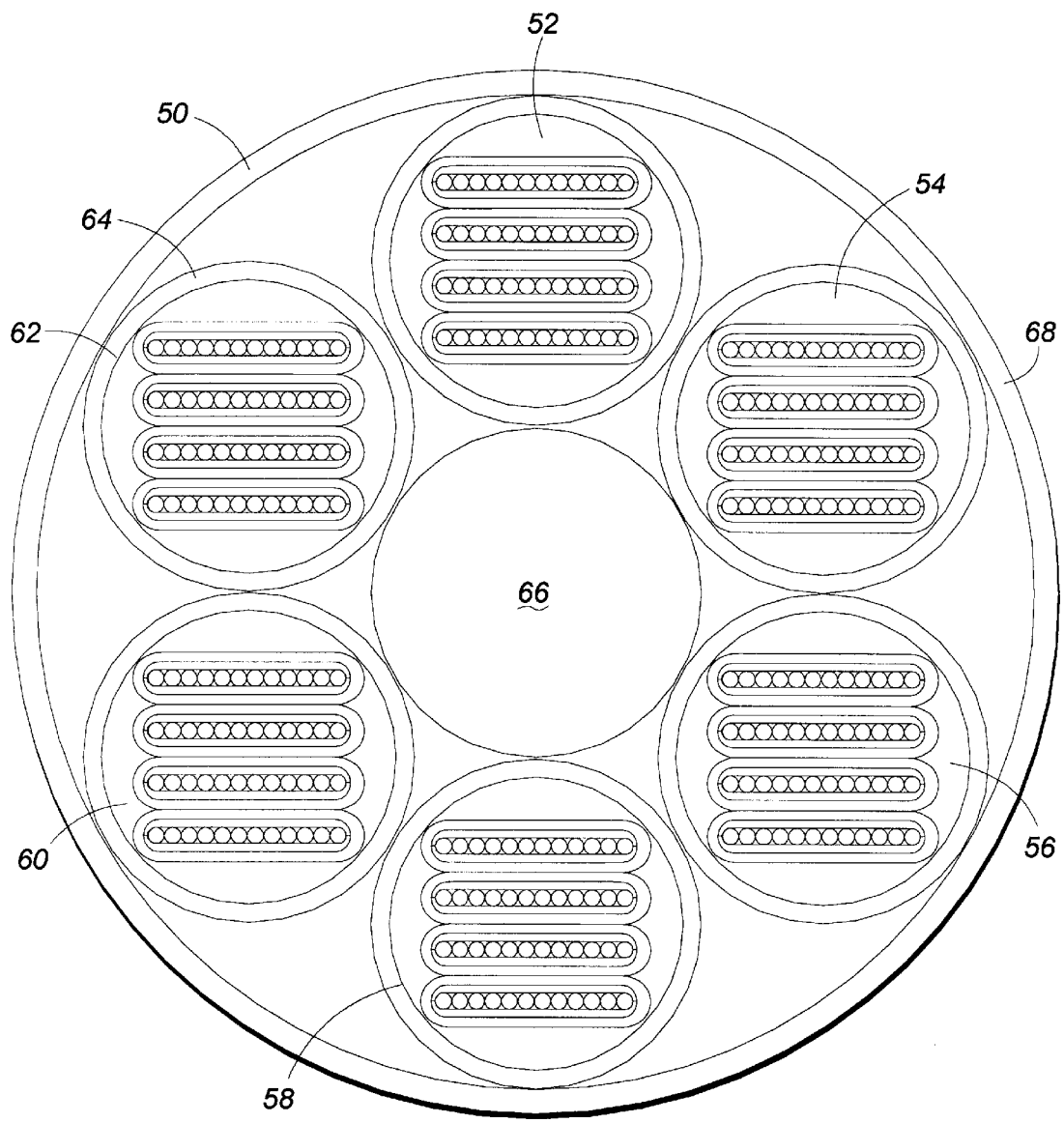
FIG. 4 is a cross sectional view of an alternative cable made of a plurality of the single ribbon structures of FIG. 2 and the ribbon bundle subunits of FIG. 3.

With reference to FIG. 4, an alternative high density breakout cable structure 50 is shown. The high density breakout cable structure 50 of FIG. 4 has an even higher density of optical fibers than does the high density breakout cable structure 40 shown in FIG. 3. With reference to FIG. 4, six ribbon bundle subunits 52, 54, 56, 58, 60, 62 are assembled together, and they are, in turn, each surrounded by a sheath, such as the subunit sheath 64 which surrounds the ribbon bundle subunit 62. In order to provide greater strength to the cable structure 50, it preferably includes a central organizing member 66 which is used to effectively organize the ribbon bundle subunits 52, 54, 56, 58, 60, 62. As will be understood by those skilled in the art, the cable structure 50 is also surrounded by an outer sheath 68. Again, the ribbon bundle subunits 52, 54, 56, 58, 60, 62 are preferably covered by powder, such as talc, to permit them to slide relative to one another, to facilitate the bending of the cable by allowing the internal units to slide, rather than bind. All of the subunit sheaths, and the outer sheath, are preferably made of a suitable material, such as PVC, polyolefin, or other suitable material.

As described herein, the high density breakout cable for use in wiring premises is made up of a ribbon of optical fibers. The ribbon of optical fibers is made in the standard manner, as described above. In general, the standard ribbons of optical fibers are passed through an ultraviolet ("UV") acrylate material which cures under UV exposure. Then it goes into a UV "oven" for curing, which creates an edge bonded ribbon. In an alternative approach to edge bonding, the optical fibers are passed through a thermoplastic filler material which is used to create a matrix of optical fibers and filler material. As used herein, either of the foregoing techniques, or any similar technique, may be used to make the optical fiber ribbon. Irrespective of the manner in which the optical fiber ribbon is actually made, as used herein, the optical fibers will be considered to be "adjacent" one another, even though there may be filler material therebetween.

Unlike the prior art structures in which only a major bundle was surrounded by a strength material, causing the individual ribbon bundles, and optical fibers within them, to be subjected to undue stress after they were broken out of the main cable bundle, cables made in accordance with the present invention have both strength members and outer sheaths associated with subgroupings of optical fibers, thereby increasing the overall strength of the individual ribbons and minimizing the likelihood of damage or breakage of the fibers due to their being subjected to undue stress.

Another advantage of the cable bundle of the present invention is that it allows for the breakout of ribbon bundles from the cable, and the cable bundles which are broken out have all of the protective qualities of the main cable. Similarly, when ribbons are broken out of the ribbon bundles, they also maintain the protection of both the outer sheath and the strength members.

A further advantage of the present invention over those prior art cables which included only a strength member which surrounded them is that the present invention illustrates a way to incorporate a large number of optical fibers, as required in an apartment or commercial building, within a single main cable so that only one cable must be pulled through the riser or plenum. This both saves time, and minimizes the likelihood of having a problem due to interference with a cable which is already present in the plenum or riser.

We claim:

1. An optical fiber ribbon bundle comprising:
   (a) a plurality of ribbon structures, each of said ribbon structures comprising:
      (i) a plurality of optical fibers, each of said optical fibers being adjacent to another optical fiber, wherein each said ribbon structure has a single layer of optical fibers and each said ribbon structure has a top side above said layer of optical fibers and a bottom side below said layer of optical fibers, when said layer of optical fibers is viewed on edge through a cross-section thereof;
(ii) at least one strength member being positioned along one of said top side or said bottom side, said at least one strength member being made of a fiber material having a breaking strength which is substantially greater than that of said optical fibers; and
(iii) a protective sheath which surrounds said optical fibers and said strength member;
(b) a subunit sheath which surrounds all of said ribbon structures within said ribbon bundle; and
(c) said ribbon structures filling a portion of space inside of said subunit sheath with a remainder of said space being filled by air.

2. The optical fiber ribbon bundle of claim 1 wherein said protective sheath which surrounds each individual ribbon structure is made of a material selected from the group consisting of polyolefin, PVC, low smoke PVC, EVA, FEP, PVDF, and thermoplastic fluoropolymers.

3. The optical fiber ribbon bundle of claim 2 wherein said subunit sheath which surrounds all of the individual ribbons structures within said ribbon bundle is made of a material selected from the group consisting of polyolefin, PVC, low smoke PVC, EVA, FEP, PVDF, and thermoplastic fluoropolymers.

4. The high density fiber optic cable of claim 1 wherein said ribbon bundles are helically wound.

5. The high density fiber optic cable of claim 1 wherein said ribbon bundles are bound together in a reverse oscillating lay.

6. A high density fiber optic cable for premises wiring comprising a plurality of fiber optic ribbon bundles, each ribbon bundle comprising:
(a) a plurality of ribbons made of optical fibers, each of said ribbons comprising:
(i) a plurality of optical fibers, each of said optical fibers being adjacent to another optical fiber, whereby said ribbon has a single layer of optical fibers and said ribbon has a top side above said layer and a bottom side below said layer, when said layer is viewed on edge through a cross-section thereof;
(ii) at least one strength member being arranged along one of said top side or said bottom side, said strength member being made of a fiber material having a breaking strength which is substantially greater than that of said optical fibers; and
(iii) a protective sheath which surrounds said ribbon and said strength member; and
(b) a subunit sheath which surrounds all of said ribbons within said ribbon bundle;
(c) said ribbons filling a portion of space inside of said subunit sheath with a remainder of said space being filled by air; and
(d) an outer sheath which surrounds a plurality of said ribbon bundles.

7. The high density fiber optic cable of claim 6 wherein said ribbon bundles are helically wound.

8. The high density fiber optic cable of claim 7 wherein said ribbon bundles are powdered in order to allow them to slip relative to one another.

9. The high density fiber optic cable of claim 8 wherein said ribbon bundles are powdered with talc.

10. The high density fiber optic cable of claim 9 wherein said protective sheath which surrounds each individual ribbon structure is made of a material selected from the group consisting of polyolefin, PVC, low smoke PVC, EVA, FEP, PVDF, and thermoplastic fluoropolymers.

11. The high density fiber optic cable of claim 10 wherein said subunit sheath which surrounds all of the individual ribbons structures within said ribbon bundle is made of a material selected from the group consisting of polyolefin, PVC, low smoke PVC, EVA, FEP, PVDF, and thermoplastic fluoropolymers.

12. The high density fiber optic cable of claim 6 wherein said ribbon bundles are bound together in a reverse oscillating lay.

13. The high density fiber optic cable of claim 12 wherein said ribbon bundles are powdered in order to allow them to slip relative to one another.

14. The high density fiber optic cable of claim 13 wherein said ribbon bundles are powdered with talc.

* * * * *